Oct. 20, 1953     R. A. HAGSTROM     2,655,949
COMPOSITE PICKER STICK
Filed Aug. 16, 1952
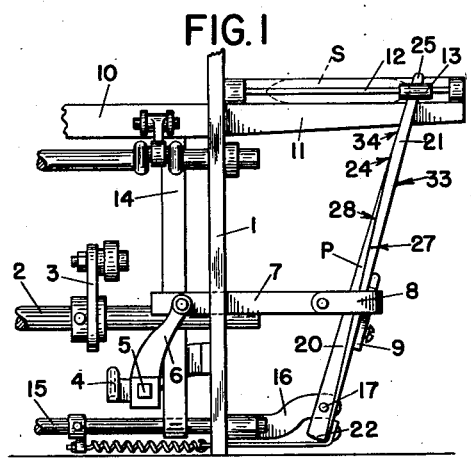
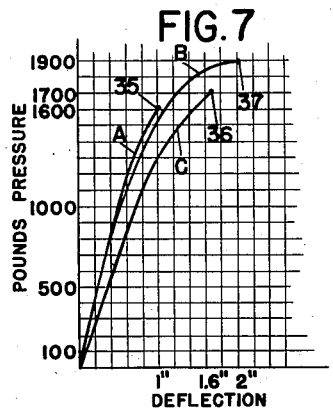
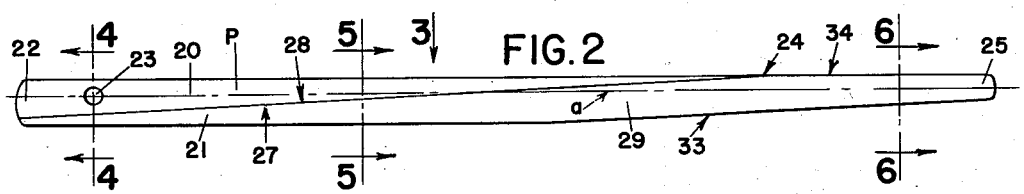
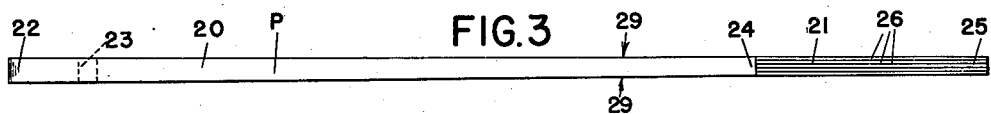
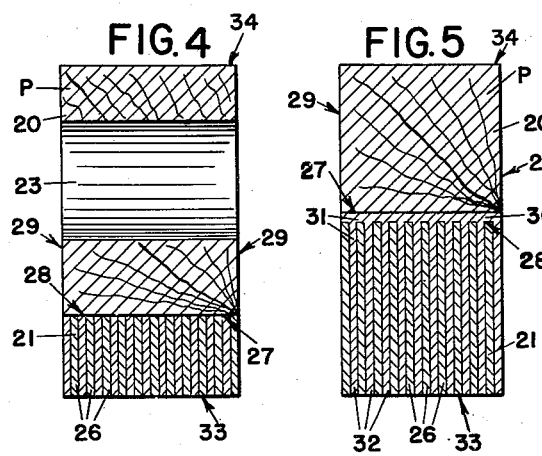
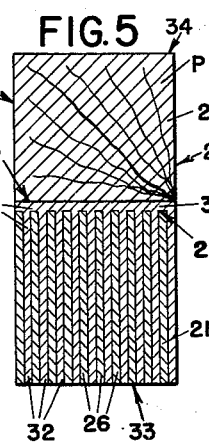
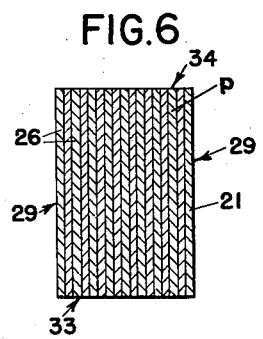
INVENTOR
RAYMOND A. HAGSTROM
Chas. T. Hawley
ATTORNEY Patented Oct. 20, 1953

2,655,949

UNITED STATES PATENT OFFICE 2,655,949

COMPOSITE PICKER STICK

Raymond A. Hagstrom, Worcester, Mass., assignor to Crompton & Knowles Loom Works, Worcester, Mass., a corporation of Massachusetts Application August 16, 1952, Serial No. 304,789

10 Claims. (Cl. 139—157)

This invention relates to improvements in picker sticks for looms, and it is the general object of the invention to provide a composite picker stick made of two different types of materials combined in such a way as to provide a picker stick having shock resistance properties greater than a stick made entirely of one or the other of the two materials.

Picker sticks for looms have in the past been cut from a block of wood, preferably hickory, and given little or no special treatment. More recently it has been proposed to use picker sticks made of laminated material the plies of which are subjected to pressure and some condensation during the manufacture of the material. The effect of the condensation increases the wear resisting properties of the stick but appears also to reduce the amount of shock or strain to which the stick can be subjected before it will break. The untreated hickory has considerable elasticity and can withstand more shock than can the laminated condensed material, but its wearing qualities do not equal those of sticks made of laminated products.

It is an important object of the present invention to provide a picker stick made of two parts or components fastened together, one of said parts being an untreated wood, such as hickory, and the other being a laminated product possessed of wearing qualities better than those possessed by the untreated wood. It has been found that when a picker stick is made in this manner it has a resistance to breakage which is greater than the resistance which would be offered by a picker stick made entirely of hickory, or entirely of a laminated product.

It is another object of the invention to provide a picker stick having a laminated material part located along the length of the stick at those points at which wear by the lug strap and picker are likely to develop and fasten this part of the stick to another part of untreated natural wood which serves as a reinforcement of the first part.

It is a still further object of the invention to provide a picker stick having a part thereof of wedge or triangular shape made of a natural wood product with a hole for the supporting pin for the picker stick extending through the wider end of the part, and secure a second part of the stick to the first part and make it of a laminated wood product which preferably extends beyond the top of the first part. The two parts or components taper in opposite directions, and the laminated component tends to resist any warping tendency which may develop in the natural wood component.

In order that the invention may be clearly understood reference is made to the accompanying drawings which illustrate by way of example the embodiments of the invention and in which:

Fig. 1 is a rear elevation of the lower part of one end of the loom having the invention applied thereto, Fig. 2 is a rear elevation on an enlarged scale of the picker stick shown in Fig. 1, Fig. 3 is an end view of the stick looking in the direction of arrow 3, Fig. 2, Fig. 4 is an enlarged transverse cross section through the lower end of the picker stick on line 4—4, Fig. 2, Fig. 5 is an enlarged diagrammatic section on line 5—5, Fig. 2, illustrating the manner in which the adhesive which holds the two parts of the stick together is united with the adhesive which holds the plies of the laminated part, Fig. 6 is an enlarged section on line 6—6, Fig. 2, and Fig. 7 is a diagram indicating graphically the improved properties of the picker stick set forth herein.

Referring more particularly to Fig. 1, the loom frame 1 supports a shaft 2 having secured thereto a picking arm 3 for cooperation with a cam 4 on a picker shaft 5. Secured to shaft 5 is a picker arm 6 connected to a sweep stick 7 to the right hand end of which is secured a lug strap 8. Any convenient support 9 may be secured to the picker stick P to hold the lug strap in adjusted vertical position. The loom is provided with a lay 10 of usual construction made with a lay end 11 on which is mounted a picker spindle 12 to guide a picker 13 which propels the shuttle S. The lay is supported on swords one of which is shown at 14 mounted on a rocker shaft 15 having secured thereto a rocker foot 16 provided with a pivotal mounting or pin 17 for support of the picker stick.

The matter thus far described, except the picker stick, is of usual construction and operates in the ordinary manner to move the stick to the left to propel the shuttle.

The picker stick P forming the subject matter of the present invention is made of two components or parts 20 and 21. The component 20 is made of natural non-densified wood not subject to any more treatment than is customary in seasoning and drying operations and is preferably hickory and made in substantially triangular form. The lower part 22 of component 20, at the left in Fig. 2, is broadened and has a perforation 23 for the stud or pivotal mounting 17. The component 20 extends along a part at least of the stick and tapers upwardly to a point 24 which is at a substantial distance below the top 25 of the stick and is located between the ends of the stick.

The component 21 extends preferably for the full length of the stick and is made of a number of thin flat parallel wood plies or laminations 26 which extend lengthwise of the stick. During the making of the material from which the component 21 is constructed the laminations 26 are subjected to considerable pressure resulting in their densification so that the component 21 per unit of volume will ordinarily be heavier than an equal volume of component 20. Due to the compressing of the laminations the component 21 is resistant to wear and because of this fact the stick is preferably mounted in the loom as shown in Fig. 1 with the component 21 in engagement with the picking force exerting part of lug strap 8 and with the picker 13 engaging the top of the stick which is made entirely of component 21.

The component 20 preferably has a straight flat surface 27 which abuts and extends along a similar surface 28 on the component 21. The two surfaces are fastened adhesively to each other along a plane transverse of the sides 29 of the stick and indicated at 30 and disposed diagonally with respect to the longitudinal axis of the stick indicated by line a, Fig. 2.

The adhesive may be a resorcinol phenolic compound, such for example as "Penacolite G-1124." The thin layer or film of adhesive which joins the components 20 and 21 is indicated diagrammatically at 31 in Fig. 5 from which it will be seen that the film of adhesive not only extends across the surface 27 but also adheres to the edges of the laminations 26 on surface 28. When the laminations 26 are secured to each other by a compound similar to that already mentioned the films 32 of adhesive between the laminations may be united integrally with the film 31, as will be apparent from Fig. 5.

It is to be understood that the invention is not limited to the specific adhesive already mentioned hereinbefore, but it is desirable though not necessary to have the same type of adhesive to unite the components and also unite the laminations.

After the two components 20 and 21 are shaped as indicated adhesive is applied to the surfaces 27 and 28 and the two parts are put in a press and subjected to sufficient pressure to insure close contact of the two surfaces 27 and 28 and uniform spreading of the adhesive. This operation may be performed under pressure at a press temperature of about 250° F. so that the glue line temperature will be about 180° F. The pressure is preferably applied uniformly between the edges 33 and 34 of the stick with no material resultant densification of the components.

Fig. 7 sets forth graphically properties of three different picker sticks, the curve marked A representing the breaking point and deflection of a stick made of a well-known laminated densified material similar to component 21, the curve C representing a stick made of non-densified hickory, and the curve B representing properties of a stick made as set forth herein.

In these tests a steadily increasing load was applied to the sticks at about the point where they would be engaged by a lug strap. Curve A terminates at point 35 representing the point of breakage after a force of about 1600 pounds was applied to the stick edgewise and had caused a deflection of approximately one inch. At this point the laminated stick broke abruptly. The point 36 represents the point of failure of a stick made entirely of non-densified hickory and shows a somewhat better performance than that indicated by curve A. It will be seen that a force of about 1700 pounds was required to cause breakage of the hickory stick after it had been deflected a little more than 1.6 inches.

The point 37 on curve B represents the point of breakage of the composite stick set forth herein and this occurred only after a force of approximately 1900 pounds had caused a deflection of two inches.

In another test a weight of 14.5 pounds was dropped on each of three sticks made as described for the first test. The weight fell on the sticks at about the point of normal engagement with the lug strap. As a result of these tests it was found that an average fall of seven feet would break the laminated stick. The results of these tests on the laminated sticks were close due to the uniformity of the material. Tests on ten hickory sticks showed breakage resulting from falling of the weight of from four to nine feet. This wide range is due to the variation in the natural hickory wood. In these two tests, in most instances, a single blow of the weight caused breakage at the highest figure. The tests started with a fall of four feet and this was increased in six inch steps.

The stick as set forth herein was then subjected to a similar test, but it was found that the stick could withstand 150 blows with the weight falling from a height of 9 feet 9 inches, after which some fracture was noted. This line of tests showed clearly that a composite stick made as described is very superior to sticks made entirely of laminated or natural wood.

These tests showed that the breaking point and resistance to shock were considerably beyond that which had been expected and indicated that the stick described herein had higher properties in these respects than sticks made solely of the laminated material, or solely of the natural non-densified hickory.

It is to be understood that the drawing sets forth a picker stick having definite relative proportions for the components 20 and 21, but the invention is not to be limited to the exact form shown for instance in Fig. 2. Thus, the point 24 can be higher on the stick if desired and the lower end 22 of component 20 need not be exactly as shown in Fig. 2, although it is desirable to have the perforation 23 located entirely within one of the components, the component shown herein being the hickory part 20.

From the foregoing it will be seen that the invention sets forth a composite picker stick made of two component parts one of which is a natural non-densified resilient wood, such as hickory, and the other of which is made of laminated material having densified layers or laminations 26. These laminations may be birch or beech, although the invention is not to be limited to these woods for the manufacture of the component 21. It will also be seen that the stick is set in the loom in such manner that edge 33 of the stick has force transmitting engagement with the lug strap 8 and picker 13 engages not only edge 33 but also the upper part of edge 34 formed by the densified wear resisting component 21. The component 20 is subjected to no substantial wear incident to use of the stick. It will also be seen that the perforation 23 is located entirely within the component 20 as shown herein. The method of manufacturing results in a close joint being defined between the edges of the laminations 26 and the surface 27 of the component 20, and there is also a union of the adhesive 31 between the components 20 and 21 with the adhesive 32 which holds the laminations together. The two parts of the stick are therefore securely bound to each other along their surfaces of contact, 27 and 28, and these surfaces are disposed so that the components taper in opposite directions. At the point where lug strap 8 is located on the stick the two components are of substantially the same width, although there may be some variation in this proportion, and the upper part of the stick which is engaged by the picker 13 is preferably made entirely of the component 21. Furthermore, the laminated component 21 tends to resist any tendency to warp which may develop in component 20.

Having now particularly described and ascertained the nature of the invention and in what manner the same is to be performed, what is claimed is:

1. A composite picker stick having sides and opposite edges and made of two components, one of said components being made of a plurality of substantially parallel longitudinally extending densified wood laminations adhesively secured together and extending along one edge of the stick, and the other component extending along part at least of the opposite edge of the stick and made of a single piece of non-densified wood adhesively secured to said one component along a plane transverse of the sides of the stick.

2. The picker stick set forth in claim 1 wherein said plane extends diagonally with respect to the axis of the stick and said components are tapered in opposite directions.

3. The picker stick set forth in claim 1 wherein said one component extends for the full length of the picker stick and said other component extends from one end of the stick part way along said opposite edge and terminates at a point between the ends of the stick.

4. The picker stick set forth in claim 1 wherein the laminations of the first component and the two components are joined together by a similar type of adhesive, the layers of adhesive between the laminations being integrated with the layer of adhesive between the said two components.

5. The picker stick set forth in claim 1 wherein the laminations abut and are adhesively secured to the adjacent side of said other component.

6. The picker stick set forth in claim 1 wherein the part of said other component adjacent to one end of the picker stick is provided with a perforation for a pivotal mounting for the stick.

7. The picker stick set forth in claim 1 wherein said one component forms said one edge of the picker stick and also a part of the other edge of the stick.

8. The picker stick set forth in claim 1 wherein said other component is generally of triangular form and tapers from one end of the stick toward the other end thereof and terminates between the ends of the picker stick.

9. The picker stick set forth in claim 1 wherein said other component is made of a single piece of hickory.

10. The picker stick set forth in claim 1 wherein the grain of the wood in both of said components runs substantially lengthwise of the picker stick.

RAYMOND A. HAGSTROM.

References Cited in the file of this patent

UNITED STATES PATENTS

| Number | Name | Date |
| --- | --- | --- |
| 870,904 | Rossignol | Nov. 12, 1907 |
| 2,419,086 | Norris, Sr. et al. | Apr. 15, 1947 |
| 2,440,181 | Muller | Apr. 20, 1948 |
| 2,600,019 | Norris, Sr. | June 10, 1952 |

FOREIGN PATENTS

| Number | Country | Date |
| --- | --- | --- |
| 602,993 | Great Britain | June 7, 1948 |